(12) United States Patent
Christensen

(10) Patent No.: US 10,196,572 B2
(45) Date of Patent: *Feb. 5, 2019

(54) PROCESS FOR CONVERSION OF NATURAL GAS TO LIQUID HYDROCARBONS AND A PLANT FOR CARRYING OUT THE PROCESS

(71) Applicant: Haldor Topsøe A/S, Kgs. Lyngby (DK)

(72) Inventor: Thomas Sandahl Christensen, Kgs. Lyngby (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,954

(22) Filed: May 17, 2017

(65) Prior Publication Data
US 2017/0247620 A1 Aug. 31, 2017

Related U.S. Application Data

(63) Continuation of application No. 14/885,550, filed on Oct. 16, 2015, now Pat. No. 9,683,176.

(51) Int. Cl.
*C01B 3/38* (2006.01)
*C10G 2/00* (2006.01)

(52) U.S. Cl.
CPC ............ *C10G 2/30* (2013.01); *C01B 3/382* (2013.01); *C01B 2203/0244* (2013.01); *C01B 2203/0261* (2013.01); *C01B 2203/043* (2013.01); *C01B 2203/062* (2013.01); *C01B 2203/142* (2013.01); *C01B 2203/148* (2013.01)

(58) Field of Classification Search
CPC . C01B 3/50; C01B 2203/147; C01B 2203/04; C10G 2/30; C10G 2/232
See application file for complete search history.

(56) References Cited

U.S. PATENT DOCUMENTS

2015/0073188 A1  3/2015 Floudas

FOREIGN PATENT DOCUMENTS

WO  WO 2013/061040 A2  5/2013
WO  WO 2014/037201 A1  3/2014

*Primary Examiner* — Jafar F Parsa
(74) *Attorney, Agent, or Firm* — Blank Rome LLP

(57) ABSTRACT

A process and plant for conversion of a feed hydrocarbon stream to liquid hydrocarbon products in a small scale GTL plant, comprising the use of a cryogenic air separation unit (ASU), optionally together with vacuum pressure swing adsorption (VPSA), an autothermal reformer (ATR) or catalytic partial oxidation (CPO), and pressure swing adsorption (PSA) unit to produce a synthesis gas for downstream Fischer-Tropsch (FT) synthesis for production of liquid hydrocarbons.

8 Claims, 1 Drawing Sheet

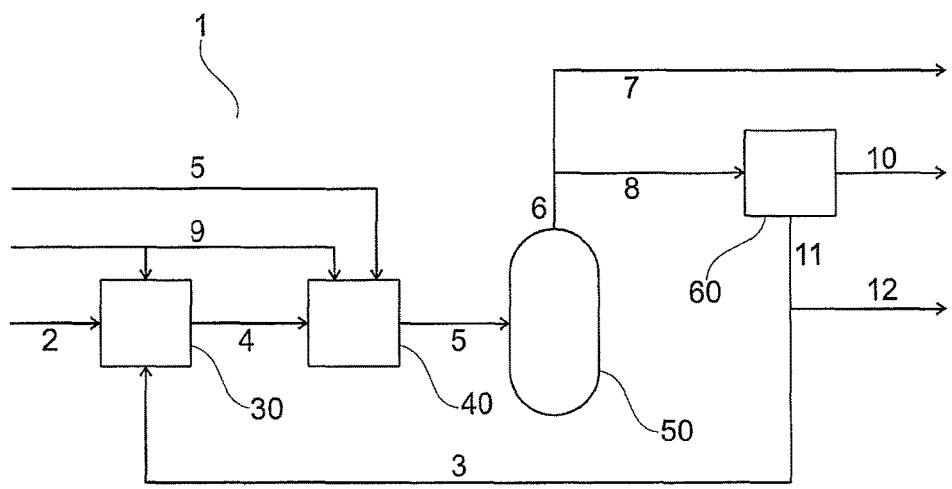

PROCESS FOR CONVERSION OF NATURAL GAS TO LIQUID HYDROCARBONS AND A PLANT FOR CARRYING OUT THE PROCESS

RELATED APPLICATIONS

This is a continuation of U.S. application Ser. No. 14/885,550, filed Oct. 16, 2015, the entire disclosure of which is hereby incorporated by reference.

BACKGROUND OF THE INVENTION

The present invention relates to a process for conversion of a feed hydrocarbon stream such as natural gas to liquid hydrocarbon products. More specifically, the invention relates to a process comprising the use of a cryogenic air separation unit (ASU), optionally together with vacuum pressure swing adsorption (VPSA), to provide oxygen with purity of at least 80% vol. The feed hydrocarbon stream is combined with steam, optionally with subsequent pre-reforming, and passed with the oxygen through an autothermal reformer (ATR) or catalytic partial oxidation (CPO) to produce a raw synthesis gas, of which a portion is passed through a pressure swing adsorption (PSA). The raw synthesis is used in downstream Fischer-Tropsch synthesis for production of liquid hydrocarbons, including production of a Fischer-Tropsch tail gas stream which is recycled to e.g. the feed hydrocarbon stream prior to or after addition of steam, or to the ATR or CPO. The invention further relates to a plant for carrying out the process. The process and plant are particularly suitable for small GTL plant(s) producing e.g. 500-5000 BPD of liquid hydrocarbons, in particular 1000-3000 BPD.

It is well-known to use autothermal reforming (ATR) for producing synthesis gas from e.g. natural gas with downstream production of liquid hydrocarbons, since ATR technology is capable of producing synthesis gas with the right $H_2/CO$ molar ratio of about 2 required for downstream Fischer-Tropsch synthesis used for producing liquid hydrocarbons, in particular diesel.

While the combination of ATR and Fischer-Tropsch is normally used in large plants, also called gas to liquid (GTL) plants where large natural gas reserves exist, there is an increasing demand to produce liquid hydrocarbons from much smaller natural gas reserves, i.e. by providing small GTL plants. This development is at least partly driven by poor pipeline accessibility to the remote places where such smaller natural gas reserves (fields) are located. Hence, it is desirable to be able to convert natural gas to liquid hydrocarbons, as the latter is easier to transport. Apart from natural gas, associated gas, also called associated petroleum gas (APG), may also suitably be converted to liquid hydrocarbons, instead of being flared.

For small GTL plants producing about 1000 BPD (barrels per day) from a natural gas feed, it is known from U.S. Pat. No. 9,034,208 to combine the use of vacuum pressure swing adsorption, autothermal reforming, and hydrogen removal by means of a hydrogen-membrane while using the tail gas from Fischer-Tropsch synthesis (Fischer-Tropsch tail gas) as fuel to preheat the feeds supplied to the autothermal reforming stage.

SUMMARY OF THE INVENTION

It is an object of the present invention to provide a process and plant which is more energy efficient and more inexpensive than prior art processes, particularly for small GTL plants.

As used herein the term "small GTL plant(s)" means a plant capable of producing 500-5000 BPD of liquid hydrocarbons.

This and other objects are solved by the present invention.

We have found that by providing a cryogenic air separation unit in combination with autothermal reforming or catalytic partial oxidation, pressure swing adsorption of raw synthesis gas from the ATR as well as Fischer-Tropsch tail gas recycle to the hydrocarbon feed or to the ATR, significant and unexpected advantages are obtained.

Accordingly, in one aspect of the invention there is provided a process for the conversion of a feed hydrocarbon stream into liquid hydrocarbons comprising:

(a) providing oxygen with a purity of at least 80% vol., preferably at least 85% vol., more preferably at least 90% vol., most preferably at least 95% vol., by using a cryogenic air separation unit (ASU);

(b) mixing steam to the feed hydrocarbon stream to form a hydrocarbon-steam stream;

(c1) adding the oxygen of step (a) and the hydrocarbon-steam stream of step (b) to an autothermal reformer (ATR), or catalytic partial oxidation (CPO) unit, or (c2) combining the oxygen of step (a) with the resulting stream of step (b) and then adding to an autothermal reformer (ATR), or catalytic partial oxidation (CPO) unit;

(d) withdrawing from the ATR or CPO a raw synthesis gas, splitting this raw synthesis gas into a first and second raw synthesis gas, passing the second raw synthesis gas through a pressure swing adsorption (PSA) unit, withdrawing a hydrogen-rich stream and a PSA-off gas stream from the PSA unit;

(e) converting the first raw synthesis gas from step (d) into liquid hydrocarbons through Fischer-Tropsch synthesis;

(f) recycling tail gas from the Fischer-Tropsch synthesis to the feed hydrocarbon stream prior to step (b), to step (b), to step (c1), to step (c2), or combinations thereof.

In one embodiment of the invention in connection with the above or any of the below embodiments, the feed hydrocarbon stream is subjected to a desulphurization step. In particular, prior to step (b) the feed hydrocarbon stream is subjected to a desulphurization step. Suitably, this desulphurization step is conducted upstream one or more pre-reformers. In the desulphurization step sulphur compounds such as organic sulphur compounds are removed by conversion with hydrogen to hydrogen sulphide ($H_2S$) with subsequent absorption on ZnO or other suitable absorption mass. The desulphurization step enables elimination of sulphur compounds which are poisonous to catalysts used in downstream units, such as pre-reformer catalysts or autothermal reforming catalysts. The tail gas from the Fischer-Tropsch synthesis which is recycled to the feed hydrocarbon stream prior to step (b) may thus suitably be recycled to the desulphurization step.

In one embodiment of the invention in connection with any of the above or below embodiments, the hydrocarbon-steam stream is pre-reformed in one or more pre-reformers, preferably in one or more adiabatic pre-reformers.

The term "pre-reforming" and "pre-reformer" as used herein shall mean a steam reforming process and steam reformer by which higher hydrocarbons are converted to a mixture of methane, carbon oxides and hydrogen at temperatures in the range 375-650° C., more specifically 400-600° C., preferably adiabatically in a fixed bed of catalyst, and its main purpose is to remove hydrocarbons higher than methane. Thus, as used herein "higher hydrocarbons" are hydrocarbons with 2 or more carbon atoms ($C_{2+}$).

As is well known for a person skilled in the art, the term "pre-reforming" shall not be exchanged with steam reforming or other reforming processes, such as steam methane reforming (SMR), autothermal and/or secondary reforming. Pre-reforming is normally conducted at the above temperatures (375-650° C.) in a fixed bed of catalyst, and its main purpose is to remove hydrocarbons higher than methane, whereas steam methane reforming is a subsequent stage conducted at much higher temperatures (700-1000° C.) and with the main purpose of producing a mixture of CO, $CO_2$ and $H_2$ (synthesis gas) suitable for downstream applications such as Fischer-Tropsch synthesis in large scale plants (e.g. above 5000 BPD).

In another embodiment in connection with any of the above or below embodiments, step (a) further comprises using Vacuum Pressure Swing Adsorption (VPSA). Accordingly, the oxygen with purity of at least 80% vol. is provided by combining cryogenic ASU and VPSA. By combining these units it is possible to reduce the capital costs associated with the provision of the oxygen. VPSA units are also simpler than ASU units and also smaller in size.

In yet another embodiment in connection with any of the above or below embodiments, the hydrogen-rich stream of step (d) is used in hydroprocessing units downstream, such as hydrocracking or hydrotreating units in the upgrading section of the Fischer-Tropsch synthesis, or in the desulphurization step, as described above, or in both. The provision of the hydrogen-rich stream of step (d) in the desulphurization step, e.g. prior to step (b) enables reducing the size of the desulphurization section due to the higher purity of the hydrogen. By way of comparison, a hydrogen stream from $H_2$-membranes will include $CO_2$ and $H_2O$ moisture which will impact the $H_2S$ absorption and result in undesired $H_2S$ slippage from the desulphurization step to the pre-reformer(s) and/or autothermal reformer. Contrary to the prior art, particularly if a $H_2$-membrane were used, the hydrogen removed in the PSA has already an elevated pressure, e.g. 20 atm, for downstream processes such us units within the upgrading section of the Fischer-Trospch section, for instance hydroprocessing units, more particularly hydrocracking units. A booster compressor is still needed, but it is much less energy intensive and thereby much less expensive than compressing from atmospheric pressure. In addition, since the $H_2$ purity from the PSA is higher than a $H_2$-membrane, i.e. >99.9% instead of 92-98%, the amount of hydrogen required is reduced. This enables additional reduction of highly expensive compression requirements and concomitantly better energy efficiency in the process is achieved. For example, hydrogen that comes from the PSA is at high pressure, but not the required pressure (i.e. it is 20 bar vs a few bars). A compressor to recycle back to the desulphurization step upstream may be required as so is a compressor to the hydrocracking section downstream. Yet, these compressors are significantly smaller compared to a situation where a $H_2$-membrane is utilized.

From the PSA an off-gas is also produced. This off-gas is normally at low pressure and used as fuel.

In yet another embodiment in connection with any of the above or below embodiments, the feed hydrocarbon stream is natural gas, associated gas, or combinations thereof. While associated gas is known in particular to contain a significant amount of higher hydrocarbons ($C_{2+}$), natural gas despite having a lower amount of higher hydrocarbons, may also benefit from having these removed, preferably by use of pre-reforming as mentioned above.

In yet another embodiment in connection with any of the above or below embodiments, steam is added to the oxygen of step (a). Hence, the oxygen from the cryogenic ASU optionally including VPSA, is mixed with steam prior to entering the ATR or CPO. The steam serves to dilute the oxygen to the required levels in the ATR thereby providing safety and further enabling use of inexpensive construction materials.

It would be appreciated that the oxygen purity obtained from the cryogenic ASU or VPSA may vary. For instance the cryogenic ASU may provide oxygen with purity of 90% vol. or more, e.g. 95% vol. or more, while the VPSA may provide oxygen with purity of 80% vol. or more, e.g. 90-92% vol. The provision of oxygen with purity of at least 80% vol., preferably at least 80% vol., more preferably at least 90% vol., most preferably at least 95% vol., may result from combining the streams from both units.

In a particular embodiment in connection with any of the above or below embodiments, in step (d) the raw synthesis is dewatered prior to passing to the PSA unit. This enables removal of water which is undesired in the Fischer-Tropsch reaction. Suitably, the entire raw synthesis gas is dewatered prior to splitting this raw synthesis gas into a first and second raw synthesis gas. Hence, according to this embodiment, the raw synthesis gas (from the ATR or CPO) is cooled in one or more heat exchangers to recover heat and passed to process condensate separator to remove water (dewatering), prior to splitting this raw synthesis gas into said first and second raw synthesis gas.

It would be understood by the skilled person that the phase separation is not necessarily 100% and thus some $H_2O$ moisture (i.e. 0-1% vol.) may be present in the dewatered stream. This depends on the cooling media used (air or water) and thereby the separation temperature.

It would also be understood that the term "raw synthesis gas" means the effluent gas from the ATR or CPO, or the effluent gas from the ATR or CPO which has passed through a water separating step in a process condensate separator and thus has been dewatered, as described above.

It is also apparent that by the present invention there is no water gas shift stage such as high temperature shift, medium temperature shift, low temperature shift, or combinations thereof, for treating the raw synthesis gas (from the ATR or CPO) upstream the PSA.

The process is particularly suitable for small GTL plants, i.e. capable of producing 500-5000 BPD of liquid hydrocarbons, suitably 500-3000 BPD.

In a second aspect of the invention there is provided a plant for producing liquid hydrocarbons from a feed hydrocarbon stream comprising a reforming section for producing synthesis gas and a Fischer-Trospch synthesis section for converting the synthesis gas into liquid hydrocarbons, in which said Fischer-Tropsch synthesis section includes an upgrading section from which said Fischer-Tropsch tail gas is produced, wherein the reforming section comprises a cryogenic air separation unit (ASU) for provision of oxygen with purity of at least 80% vol., preferably oxygen with purity of at least 85% vol., more preferably oxygen with purity of at least 90% vol., most preferably oxygen with purity of at least 95% vol.; an autothermal reformer (ATR) or catalytic partial oxidation unit (CPO) for producing a raw synthesis gas, means for splitting the raw synthesis gas into a first and second raw synthesis gas, a pressure swing adsorption (PSA) unit for hydrogen removal from the second raw synthesis gas, means for passing the first raw synthesis gas to the Fischer-Tropsch synthesis section, and means for recycling the Fischer-Tropsch tail gas to the feed hydrocarbon stream, to the ATR or CPO, or both.

It would be understood by the skilled person that the PSA also produces an off-gas which will be at low pressure and is used as fuel.

In an embodiment in connection with the above or any of the below embodiments according to the second aspect of the invention, the plant further comprises a desulphurization unit for removal of sulphur compounds from the feed hydrocarbon stream. Suitably the desulphurization unit comprises a hydrogenation unit which includes means for adding hydrogen, and a downstream absorption unit for absorbing $H_2S$ produced in the hydrogenation unit. The absorption unit is suitably provided as a vessel containing a fixed bed of ZnO or any other absorption mass.

The tail gas from the Fischer-Tropsch synthesis which is recycled to the feed hydrocarbon stream may thus suitably be recycled to the desulphurization step.

Suitably, the feed hydrocarbon stream is natural gas, associated gas, or combinations thereof.

In a particular embodiment in connection with any of the above or below embodiments according to the second aspect of the invention, the plant further comprises means for adding steam: to the feed hydrocarbon stream to form a hydrocarbon-steam stream, to the oxygen with purity of at least 80% vol., or both.

In a particular embodiment in connection with any of the above or below embodiments according to the second aspect of the invention, the plant further comprises one or more pre-reformers, preferably adiabatic pre-reformers, for removal of higher hydrocarbons ($C_{2+}$) from the hydrocarbon-steam stream.

In yet a particular embodiment in connection with any of the above or below embodiments according to the second aspect of the invention, the plant further comprises using Vacuum Pressure Swing Adsorption (VPSA) for the provision of the oxygen with purity of at least 80% vol.

As with the first aspect of the invention, it would be appreciated that the oxygen purity obtained from the cryogenic ASU or VPSA may vary. For instance, the cryogenic ASU may provide oxygen with purity of 90% vol. or more, e.g. 95% vol. or more, while the VPSA may provide oxygen with purity of 80% vol. or more, e.g. 90-92% vol. The provision of oxygen with purity of at least 80% vol., preferably at least 85% vol., more preferably at least 90% vol., most preferably at least 95% vol., may result from combining the streams from both units.

In yet another particular embodiment in connection with any of the above embodiments according to the second aspect of the invention, the plant further comprises means for using the hydrogen removed in the PSA unit in the upgrading section of the Fischer-Tropsch section, or in the desulphurization unit, or both. The provision of the hydrogen removed in the PSA unit in the desulphurization unit enables reduction of size in such unit and thereby reduced capital expenses section due to the higher purity of the hydrogen, e.g. 99.9% purity. In addition, there is a reduction in the compression requirements for the provision of the hydrogen to the desulphurization unit or the upgrading section of the Fischer-Tropsch section for instance hydroprocessing units, like hydrotreating units, more particularly hydrocracking units therein.

In yet another embodiment in connection with any of the above or below embodiments, the plant further comprises upstream said means for splitting the raw synthesis gas: one or more heat exchangers for cooling the raw synthesis gas, optionally an air cooler, and a process condensate separator to remove water from the thus cooled raw synthesis gas. This enables removal of water which is undesired in the Fischer-Tropsch reaction.

As with the first aspect of the invention, the term "raw synthesis gas" means the effluent gas from the ATR or CPO, or the effluent gas from the ATR or CPO which has passed through a water separating step in the process condensate separator and thus has been dewatered, as described above.

It is also apparent that there is no water gas shift stage such as high temperature shift, medium temperature shift, low temperature shift, or combinations thereof, for treating the raw synthesis gas (from the ATR or CPO) upstream the PSA.

The plant is particularly suitable for small GTL plants, i.e. capable of producing 500-5000 BPD of liquid hydrocarbons, suitably 500-3000 BPD.

BRIEF DESCRIPTION OF THE DRAWINGS

The sole FIGURE shows a schematic representation of a process and plant for small scale GTL according to the present invention with tail gas recycle from the Fischer-Tropsch synthesis to autothermal reformer and/or to the desulfurization unit as well as recycle of hydrogen-rich stream from the PSA unit to the desulfurization unit.

DETAILED DESCRIPTION OF THE INVENTION

In the FIGURE, a schematic process and plant 1 for producing about 3000 BPD of liquid hydrocarbon product is shown. A feed hydrocarbon stream such as natural gas 2 is passed through a desulfurization unit 30 suitably arranged as a hydrogenator followed by an absorption unit (not shown). To the natural gas 2 or to the desulfurization unit 30, more specifically to the hydrogenator therein, a hydrogen-rich stream 3 from the PSA-unit downstream is added. The desulfurized stream 4 is then mixed with steam and pre-reformed in one or more pre-reformers (not shown) before entering an autothermal reformer (ATR) 40 under the addition of oxygen 5. A raw synthesis gas 6 is withdrawn from the ATR, cooled in heat exchangers and air cooler (not shown) before passing to a water removal unit 50 such as a process condensate separator. A large portion of water is removed from this unit and the raw synthesis gas 6, now dewatered, is split into a first raw synthesis gas 7 which represents the major portion and second raw synthesis gas 8 which represents the minor portion of the raw synthesis gas 6. The first raw synthesis gas 7 is then converted to liquid hydrocarbon product by Fischer-Tropsch synthesis which includes an upgrading section (not shown) from which tail gas 9 is recycled to the hydrocarbon feed 2 (not shown), to the desulfurization unit as shown here, to the pre-reformers (not shown), or to the autothermal reformer 40, e.g. by adding tail gas 9 to the hydrocarbon stream entering the autothermal reformer. The second raw synthesis gas 8 is passed through a Pressure Swing Adsorption (PSA) unit 60 out of which a PSA off-gas 10 is produced and used as fuel as well as a hydrogen-rich stream 11 which can be diverted as hydrogen-product stream 12 due to its high purity, e.g. 99.9% hydrogen. A hydrogen recycle stream 3 is used in the hydrogenator of desulfurization unit 30 and suitably also in downstream hydrocracking units of the upgrading section of the Fischer-Tropsch synthesis (not shown).

The invention claimed is:
1. A process for the conversion of a feed hydrocarbon stream into liquid hydrocarbons comprising:

(a) producing oxygen with a purity of at least 80% vol. in at least a vacuum pressure swing adsorption (VPSA) unit;
(b) mixing steam to the feed hydrocarbon stream to form a hydrocarbon-steam stream;
(c1) adding the oxygen of step (a) and the hydrocarbon-steam stream of step (b) to an autothermal reformer (ATR), or catalytic partial oxidation (CPO) unit,
or
(c2) combining the oxygen of step (a) with the resulting stream of step (b) and then adding to an autothermal reformer (ATR), catalytic partial oxidation (CPO) unit;
(d) withdrawing from the ATR or CPO a raw synthesis gas which is first dewatered and then split into a first and second raw synthesis gas stream;
(e) removing hydrogen from the second raw synthesis gas stream without any water-gas-shift pre-treatment, and withdrawing a hydrogen-rich stream and an off gas stream;
(f) converting the first raw synthesis gas stream from step (d) into liquid hydrocarbons through Fischer-Tropsch synthesis and a tail-gas;
(g) recycling tail gas from the Fischer-Tropsch synthesis to the feed hydrocarbon stream prior to step (b), to step (b), to step (c1), to step (c2), or combinations thereof.

2. The process according to claim 1, wherein, prior to step (b), the feed hydrocarbon stream is subjected to a desulphurization step.

3. The process according to claim 1, wherein the hydrocarbon-steam stream is pre-reformed in one or more pre-reformers.

4. The process according to claim 1, wherein said producing oxygen with a purity of at least 80% vol. includes cryogenic separation unit.

5. The process according to claim 1, wherein the second raw synthesis gas is fed to a PSA unit to produce said hydrogen-rich stream.

6. The process according to claim 1, wherein the feed hydrocarbon stream is natural gas, associated gas, or combinations thereof.

7. The process according to claim 1, wherein steam is added to the oxygen of step (a).

8. A process for the conversion of a feed hydrocarbon stream into liquid hydrocarbons comprising:
(a) producing oxygen with a purity of at least 80% vol. in at least a vacuum pressure swing adsorption (VPSA) unit;
(b) mixing steam to the feed hydrocarbon stream to form a hydrocarbon-steam stream;
(c1) adding the oxygen of step (a) and the hydrocarbon-steam stream of step (b) to an autothermal reformer (ATR), or catalytic partial oxidation (CPO) unit,
or
(c2) combining the oxygen of step (a) with the resulting stream of step (b) and then adding to an autothermal reformer (ATR), catalytic partial oxidation (CPO) unit;
(d) withdrawing from the ATR or CPO a raw synthesis gas which is first dewatered and then split into a first raw synthesis gas stream, and a second raw synthesis gas stream;
(e) removing hydrogen from the second raw synthesis gas stream without any water-gas-shift pre-treatment, and withdrawing a hydrogen-rich stream and an off gas stream;
(f) converting the first raw synthesis gas stream from step (d) into liquid hydrocarbons through Fischer-Tropsch synthesis and a tail-gas;
(g) recycling tail gas from the Fischer-Tropsch synthesis to the feed hydrocarbon stream prior to step (b), to step (b), to step (c1), to step (c2), or combinations thereof.

* * * * *